United States Patent [19]

Fromuth et al.

[11] 4,180,494

[45] Dec. 25, 1979

[54] THERMOPLASTIC POLYESTERS

[75] Inventors: Harry C. Fromuth, Trevose, Pa.; Kenneth M. Shell, Delran, N.J.

[73] Assignee: Rohm and Haas Company, Philadelphia, Pa.

[21] Appl. No.: 944,112

[22] Filed: Sep. 20, 1978

Related U.S. Application Data

[63] Continuation-in-part of Ser. No. 824,674, Aug. 15, 1977, abandoned.

[51] Int. Cl.$^2$ .................... C08K 3/40; C08L 67/02
[52] U.S. Cl. .................... 260/40 R; 525/63; 525/69
[58] Field of Search .................... 260/40 R, 860, 873

[56] References Cited

U.S. PATENT DOCUMENTS

| | | | |
|---|---|---|---|
| 3,313,862 | 4/1967 | Sizzel et al. | 260/860 |
| 3,368,995 | 2/1968 | Furukawa et al. | 260/40 R |
| 3,405,198 | 10/1968 | Rein et al. | 260/873 |
| 3,564,077 | 2/1971 | Brinkmann et al. | 260/873 |
| 3,765,998 | 10/1973 | Oswald et al. | 161/170 |
| 3,769,260 | 10/1973 | Segal | 260/40 R |
| 3,792,115 | 2/1974 | Kishikawa et al. | 260/860 |
| 3,814,725 | 6/1974 | Zimmerman et al. | 260/40 R |
| 3,839,499 | 10/1974 | Jodamus et al. | 260/873 |
| 3,842,029 | 10/1974 | Saita et al. | 260/37 N |
| 3,855,277 | 12/1974 | Fox | 260/860 X |
| 3,864,428 | 2/1975 | Nakamura et al. | 260/37 PC X |
| 3,919,353 | 11/1975 | Castelnuono et al. | 260/873 |
| 3,954,903 | 5/1976 | Kudo et al. | 260/873 |
| 3,954,905 | 5/1976 | Margotte et al. | 260/873 |

FOREIGN PATENT DOCUMENTS

| | | |
|---|---|---|
| 852304 | 1/1977 | Belgium . |
| 50-67355 | 6/1975 | Japan . |
| 1102844 | 1/1977 | United Kingdom . |

*Primary Examiner*—Sandra M. Person
*Attorney, Agent, or Firm*—Michael B. Feln

[57] ABSTRACT

High impact and solvent resistant composition comprising (A) about 25 to 95 percent by weight of an aromatic polyester, (B) about 1 to 8 percent by weight of an aromatic polycarbonate, and (C) and balance to make 100% of a coreshell polymer having a butadiene-based core. Preferably the composition also includes about 1 to 150 parts by weight of glass fiber reinforcement per 100 parts of (A), (B), and (C).

10 Claims, No Drawings

THERMOPLASTIC POLYESTERS

This application is a continuation-in-part of Ser. No. 824,674, filed Aug. 15, 1977, now abandoned.

BACKGROUND OF THE INVENTION

A. Field of the Invention

This invention relates to improvements to thermoplastic aromatic polyesters.

B. Description of the Prior Art

Nakamura et al, U.S. Pat. No. 3,864,428, disclosed blends of aromatic polyester, aromatic polycarbonate, and butadiene-based core-shell polymers wherein the polycarbonate constituted 10 to 75 weight percent, preferably about 20 to about 60 weight percent, of the tertiary mixture. Incorporation of aromatic polycarbonate at the levels suggested in said patent cause reduction in resistance to certain solvents. Another problem with the compositions suggested in said patent is the reduction of the service temperature as measured by tortional modulus and deflection temperature of the aromatic polyester when glass reinforcement is used.

It is an object of the present invention to provide high impact strength compositions based on aromatic polyesters which also have satisfactory solvent resistance.

It is a further object to provide high impact and solvent resistance compositions based on aromatic polyesters which, when reinforced with glass fibers, also have increased service temperature.

These objects, and others which will become apparent from the following disclosure, are achieved by the present invention which comprises a high impact resistant, solvent resistant, and high service temperature composition comprising (A) about 25 to 95 percent of an aromatic polyester, (B) about 1 to 8 percent by weight of an aromatic polycarbonate, and (C) the balance to make 100% of a core-shell polymer having a butadiene-based core.

The aromatic polyester used for the composition of this invention is a polyester having chain units containing an optionally substituted aromatic ring in the main chain of the polymer. Examples of the substituent for the aromatic ring are halogen atoms such as chlorine or bromine, and $C_1-C_4$ alkyl groups such as methyl, ethyl, propyl and butyl groups. These aromatic polyesters can be obtained by reacting aromatic dicarboxylic acids, esters, or ester-forming derivatives thereof with glycols by known means.

Suitable glycols include polymethylene glycols having 2 to 6 carbon atoms, especially ethylene glycol, 1,4-butanediol, and 1,6-hexanediol; also 1,4-cyclohexanediol, bisphenol A, and ester-forming derivatives therof can be used.

Suitable aromatic dicarboxylic acids are naphthalene dicarboxylic acids such as naphthalene-2,6-dicarboxylic acid, terephthalic acid, isophthalic acid, p-hydroxybenzoic acid, adipic acid, sebacic acid, and ester forming derivatives thereof.

Examples of the preferred aromatic polyester (A) are polyethylene terephthalate, polytetramethylene terephthalate, and bisphenol A isophthalate, and the like. These polymers can be used either alone or in combination.

The preferred aromatic polyester (A) has an intrinsic viscosity, as measured at 30° C. using a 60/40 solution of phenol tetrachloroethane, about 0.3 to about 2.5, more preferably 0.5 to 1.2, and most preferably 0.5 to 0.7.

The aromatic polycarbonate used for the composition of this invention is preferably a polycarbonate of a di(-monohydroxyphenyl)-substituted aliphatic hydrocarbon, for example, it is possible to utilize an aromatic polycarbonate derived by the ester-exchange process or phosgene process from 2,2-(4,4'-dihydroxydiphenyl)-propane (to be referred to simply as bisphenol A). Furthermore, it is possible to replace a part or whole of the bisphenol A by a 4,4'-dihydroxydiphenylalkane, 4,4'-dihydroxydiphenylsulfone, or 4,4'-dihydroxydiphenyl ether. Or two or more of such aromatic polycarbonates may be used in admixture.

The aromatic polycarbonate (B) has a molecular weight of 15,000 to 100,000 preferably 20,000 to 50,000.

The preferred butadiene based core-shell polymer used in the present invention is a graft copolymer formed between a butadiene polymer whose butadiene units account for at least 50 mol. percent and at least one vinyl monomer. Examples of such a vinyl monomer are derivatives of acrylic and methacrylic acids, aromatic vinyl compounds, vinyl cyanide, and multifunctional derivatives, compounds, and mixtures thereof. Specific examples include $C_1-C_{10}$ alkyl esters of methacrylic acid, preferably methyl methacrylate, meth(acrylic) acid esters and multi-functional alcohols such as 1,3-butylene glycol dimethacrylate and trimethylolpropane trimethacrylate; aromatic monovinyl compounds such as styrene, vinyl toluene, alphamethylstyrene, halogenated styrene, vinyl naphthalene, or divinyl benzene, the styrene being especially preferred; vinyl cyanide compounds such as acrylonitrile, methacrylonitrile, alpha-halogenated acrylonitriles, the acrylonitrile being especially preferred. They can be used either alone or in admixture.

The graft copolymer (C) used in the present invention can be produced by any known means such as a bulk polymerization, suspension polymerization, bulk-suspension polymerization, solution polymerization or emulsion polymerization. When it is desired to produce graft copolymer (C) having a major proportion of the butadiene polymer, the use of the emulsion polymerization technique is recommended. In the production of graft polymer (C), a homo- or co-polymer of the vinyl monomer may be formed in the reaction product. But the reaction product as such may be used as the graft co-polymer (C).

Preferably more than one vinyl monomer is grafted to the butadiene rubber; for example, a preferred graft copolymer is a three stage polymer having a butadiene-based rubbery core, a second stage polymerized from styrene, and a final stage, or shell, polymerized from methyl methacrylate and 1,3-butylene glycol dimethacrylate.

The composition of the present invention comprises about 25 to 95 percent by weight of aromatic polyester (A, about 1 to 8 percent by weight of aromatic polycarbonate (B), and the balance to make 100% of core-shell polymer (C).

It has unexpectedly been discovered that these polycarbonate levels give improvements in solvent resistance and while maintaining high impact resistance, when compared with the compositions of Nakamura et al, supra. Furthermore, an improvement in service temperature over Nakamura et al is observed in glass-reinforced systems.

The thermoplastic resin composition of this invention can be prepared by uniformly mixing the above resin components (A), (B), and (C) using any desired mixing means, for example, using Banbury mixer, a hot roll or a uniaxial or multiaxial extruder. The method of blending the three components in order to obtain the thermoplastic resin composition is not particularly limited. Generally, it is preferred that the components (A), (B), and (C) are blended simultaneously, and the mixture is extruded and pelletized.

The composition of this invention may be in various forms such as powder, granule, flake, pellet or other forms of molding articles, or various forms of melt-shaped articles such as extruded or injection molded articles. The composition gives especially good results in the production of injection-molded articles. Needless to say, the composition may further contain various additives such as a stabilizer, coloring agent, fire retardant, fluorescent bleaching agent, mold releasing agent, nucleating agent, lubricant, filler, or blowing agent.

The stabilizer may, for example, be an oxidation stabilizer, light stabilizer, or heat stabilizer. Specific examples of the light stabilizer are benzotriazole compounds such as 2-hydroxy-5-methylbenzotriazole or 2-hydroxy-3-chloro-5-t-butylbenzotriazole, benzophenone compounds such as 2,4-dihydroxybenzophenone, and phenyl salicylate-type compounds such as phenyl salicylate. Examples of the oxidation stabilizer include hindered phenol compounds such as stearyl 3,5-di-t-butyl-4-hydroxyphenyl propionate, and amine compounds such as N,N'-di-beta-naphthyl-para-phenylene diamine. Examples of the heat stabilizer include sulfur compounds such as dilauryl thiopropionate and phosphorus compounds such as phosphoric acid, phosphorus acid, phosphinic acid, phosphonic acid, or esters thereof.

The coloring agent may be any desired dye or pigment.

Examples of the fire retarding agent are halogen-containing aromatic compounds such as hexabromobenzene, an oligomeric polycarbonate of tetrabromobisphenol A, decabromobiphenyl, decarbromodiphenyl ether, or tetrabromophthalic anhydride, and phosphorus compounds such as tris (2,3-dibromopropyl phosphate) or polyaryl phosphonates, the retarding agent being usable in conjunction with an assistant such as antimony trioxide.

Examples of the mold releasing agent include silicone.

Examples of the lubricant are barium stearate, calcium stearate, or fluid paraffin.

The nucleating agent may, for example, be an inorganic nucleating agent such as talc, an organic nucleating agent such as benzophenone, or a salt such as sodium terephthalate.

The filler includes, for example, fibrous reinforcement such as glass fibers, carbon fibers, asbestos, or rock wool, and particulate filler such as alumina, calcium carbonate, mica, and silica. The incorporation of these fillers is preferred because they give rise to more improvement in the mechanical characteristics, resistance to thermal deformation and fire retardance of the composition of this invention. The use of glass fiber reinforcement has unexpectedly been found to greatly improve service temperature, and its use is preferred. A preferred amount of glass fiber reinforcement is about 20 to 50 percent based on weight of reinforced composition.

Preferably, the amounts of these additives are as follows based on 100 parts of resin composition: up to 5 parts by weight of the stabilizer; up to 30 parts by weight of the fire retardant (as a total amount, when an assistant is used): 0.01 to 5 parts by weight of the mold releasing agent; 0.01 to 5 parts by weight of the nucleating agent; 0.05 to 5 percent by weight of lubricant; 1 to 150 parts by weight of the filler. The amount of the coloring agent is usually 0.01 to 5 percent by weight based on the total weight of the resins (A), (B) and (C).

The following Examples illustrate the present invention in greater detail. All parts and percentages in the Examples are on a weight basis.

EXAMPLE 1

This Example demonstrates the advantage of low levels of polycarbonate in a blend of polyethylene terephthalate (PET), aromatic polycarbonate which is the reaction product of phosgene and Bisphenol A having a molecular weight of 27,200, and core-shell polymer having a core (77.5 parts) polymerized from 71 parts butadiene and 3 parts styrene, 4 parts methyl methacrylate, and 1 part divinyl benzene; a second stage polymerized from 11 parts styrene, and a shell polymerized from 11 parts methyl methacrylate and 0.1 parts 1,3-butylene glycol dimethacrylate. The ratio of PET to core-shell polymer is 5.3 to 1 by weight. The resin blend was molded at 140° C.

A. Solvent Resistance

Moldings were made at 0, 5, and 40% polycarbonate in the resin blend, and examined after 10 minutes exposure to filter paper wet with either acetone, benzene, or methylene dichloride. The results are reported in Table 1.

TABLE I

| | SURFACE APPEARANCE AFTER 10 MINUTES EXPOSURE TO WET FILTER PAPER | | |
|---|---|---|---|
| % Polycarbonate | Acetone | Benzene | MDC |
| 0 | Slight Stain At Edge Of Paper-Surface Glossy | Slight Stain At Edge Of Paper-Surface Glossy | Slight Ridge At Edge Of Paper-Surface Glossy |
| 5 | No Change | No Change | No Change |
| 40 | Surface Dulled | Slight Ridge At Edge Of Paper - Surface Glossy | Surface Dull, Swollen, Obvious Attack |

B. Thermal Stability

This Example demonstrates the increased service temperature obtained when compositions containing low levels of polycarbonate as per Example 1A are reinforced with 30% glass fiber. Service temperature is measured by deflection temperature under flexural load (ASTM-D648) and is reported in Table II; and by Clash-Berg modulus at elevated temperatures (ASTM D-1043), and is reported in Table III.

TABLE II

DEFLECTION TEMPERATURE UNDER FLEXURAL LOAD. °C.

| % Polycarbonate In Resin | 264 psi | 66 psi |
|---|---|---|
| 0 | 200 | 245 |
| 5 | 149 | 232 |
| 15 | 102 | 192 |
| 40 | 117 | 144 |

TABLE III

CLASH-BERG MODULUS, p.s.i.

| % Polycarbonate | 140° C. | 180° C. | 220° C. |
|---|---|---|---|
| 0 | 75,000 | 46,000 | 18,500 |
| 5 | 32,500 | 15,500 | 5,100 |
| 40 | 8,000 | 2,700 | N. A. |

C. Impact Strength

Notched Izod impact strength measurements were made on samples made in accordance with Example 1A, except further including 30% fiberglass reinforcement and tested in accordance with ASTM D-256, the average of five specimens, with the results as reported in Table IV.

TABLE IV

| % Polycarbonate | Izod Impact Strength (Ft. Lbs./In.) |
|---|---|
| 0 (Control) | 1.23 ± .18 |
| 5 (Invention) | 1.74 ± .18 |
| 15 (Comparative) | 1.54 ± .11 |
| 40 (Comparative) | 2.14 ± .09 |

It was surprising in view of Nakamura et al, U.S. Pat. No. 3,864,428, that the sample with only 5% polycarbonate performs as well in the impact test as the one with 15% polycarbonate.

In another series of impact tests, with non-glass reinforced samples the ratio of core-shell polymer was varied, with the results reported in Table V.

TABLE V

| % PET | % Polycarbonate | % Core-Shell Polymer | Izod Impact Strength (Ft. Lbs./In.) |
|---|---|---|---|
| 100 | — | — | .30 |
| 95 | 5 | — | .34 |
| 95 | — | 5 | .43 |
| 80 | — | 20 | 1.51 |
| 80 | 5 | 15 | 2.82 |
| 70 | — | 30 | 2.77 |
| 70 | 5 | 25 | 16.79 |

We claim:

1. A composition having high impact and solvent resistance comprising
   A. about 25 to 95 percent by weight of an aromatic polyester;
   B. about 1 to 8 percent by weight of an aromatic polycarbonate;
   C. the balance to make 100% of a core-shell polymer polymerized from monomers comprising butadiene.

2. The composition of claim 1 wherein the aromatic polyester is polyethylene terephthalate.

3. The composition of claim 2 wherein the polyethylene terephthalate has an estimated intrinsic viscosity range of about 0.3 to 2.5.

4. The composition of claim 1 wherein the core-shell polymer has a core polymerized from over 50 percent butadiene.

5. The composition of claim 1 further including filler comprising particulate filler, fibrous reinforcement, or combinations thereof.

6. The composition of claim 1 further including about 1 to 150 parts by weight glass fiber reinforcement, based on 100 parts by weight of (A), (B), and (C).

7. The composition of claim 1 wherein the aromatic polyester (A) is polyethylene terephthalate, having an intrinsic viscosity of about 0.5 to 1.2 and the aromatic polycarbonate (B) is the reaction product of phosgene and bisphenol A.

8. The composition of claim 7 wherein the core-shell polymer (C) has a core polymerized from a monomer system comprising butadiene, styrene, methyl methacrylate, and divinyl benzene, a second stage polymerized from styrene, and a final stage polymerized from methyl methacrylate and 1,3-butylene glycol dimethacrylate.

9. The composition of claim 8 further including about 20 to 100 parts of glass fiber reinforcement.

10. An injection molded article molded from the composition of claim 1.

* * * * *